US011295462B2

(12) United States Patent
Bertram et al.

(10) Patent No.: US 11,295,462 B2
(45) Date of Patent: Apr. 5, 2022

(54) DETERMINATION OF REGISTRATION ACCURACY

(71) Applicant: Brainlab AG, Munich (DE)

(72) Inventors: Pascal Bertram, Munich (DE); Elisa Garcia Corsico, Munich (DE); Ivana Ivanovska, Aschheim (DE); Birte Domnik, Munich (DE)

(73) Assignee: BRAINLAB AG, Munich (DE)

( * ) Notice: Subject to any disclaimer, the term of this patent is extended or adjusted under 35 U.S.C. 154(b) by 44 days.

(21) Appl. No.: 15/764,789

(22) PCT Filed: Dec. 16, 2015

(86) PCT No.: PCT/EP2015/079911
§ 371 (c)(1),
(2) Date: Mar. 29, 2018

(87) PCT Pub. No.: WO2017/101990
PCT Pub. Date: Jun. 22, 2017

(65) Prior Publication Data
US 2018/0315204 A1 Nov. 1, 2018

(51) Int. Cl.
G06T 7/38 (2017.01)
G06T 7/00 (2017.01)
(Continued)

(52) U.S. Cl.
CPC .............. *G06T 7/38* (2017.01); *G06T 3/0068* (2013.01); *G06T 7/0002* (2013.01);
(Continued)

(58) Field of Classification Search
CPC combination set(s) only.
See application file for complete search history.

(56) References Cited

U.S. PATENT DOCUMENTS

2007/0167784 A1* 7/2007 Shekhar ................ A61B 6/032
600/443
2008/0265166 A1* 10/2008 Shekhar ................ G01T 1/1611
250/363.03
(Continued)

FOREIGN PATENT DOCUMENTS

WO WO2007079509 A2 7/2007

OTHER PUBLICATIONS

Song, et al. "Evaluating Image Registration Using NIREP" Biomedical Image Registration. Jul. 11, 2010.
(Continued)

*Primary Examiner* — Zhiyu Lu
(74) *Attorney, Agent, or Firm* — Middleton Reutlinger

(57) ABSTRACT

A medical data processing method, performed by a computer (2), for determining error analysis data describing the registration accuracy of a first elastic registration between first and second image data (A, B) describing images of an anatomical structure of a patient, comprising the steps of: —acquiring the first image data (A) describing a first image of the anatomical structure, —acquiring the second image data (B) describing a second image of the anatomical structure, —determining first registration data describing a first elastic registration of the first image data (A) to the second image data (B) by mapping the first image data (A) to the second image data (B) using a registration algorithm, —determining second registration data describing a second elastic registration of the second image data (B) to the first image data (A) by mapping the second image data (B) to the first image data (A) using the registration algorithm, —determining error analysis data describing the registration accuracy of the first elastic registration based on the first registration data and the second registration data.

11 Claims, 6 Drawing Sheets

Figure 1:
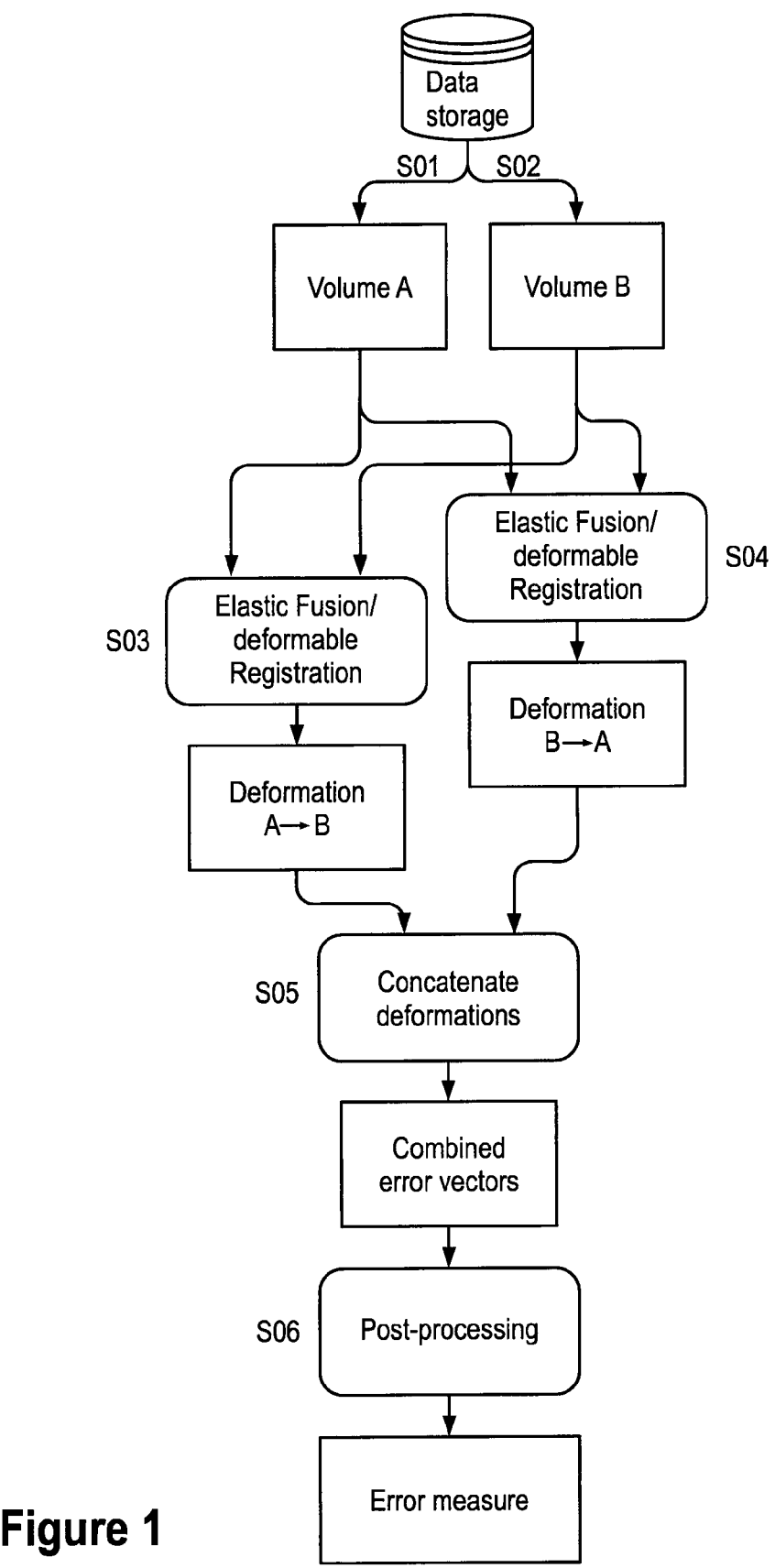

(51) Int. Cl.
*G06T 7/30* (2017.01)
*G06T 3/00* (2006.01)
*G06T 7/73* (2017.01)
*G06T 11/00* (2006.01)

(52) U.S. Cl.
CPC .............. *G06T 7/0016* (2013.01); *G06T 7/30* (2017.01); *G06T 7/74* (2017.01); *G06T 11/008* (2013.01); *G06T 2207/10081* (2013.01); *G06T 2207/20104* (2013.01); *G06T 2207/20221* (2013.01); *G06T 2207/30056* (2013.01); *G06T 2207/30081* (2013.01); *G06T 2207/30096* (2013.01); *G06T 2207/30168* (2013.01)

(56) References Cited

U.S. PATENT DOCUMENTS

| | | |
|---|---|---|
| 2011/0311115 A1 | 12/2011 | Guyu et al. |
| 2014/0171782 A1* | 6/2014 | Bruder ................. A61B 5/0035 600/411 |
| 2014/0254904 A1 | 9/2014 | Matthews |
| 2015/0201910 A1* | 7/2015 | Zhao ..................... A61B 10/04 600/424 |
| 2018/0005391 A1* | 1/2018 | Miga ........................ G06T 7/33 |

OTHER PUBLICATIONS

International Search Report and Written Opinion issued in PCT Patent Application No. PCT/EP2015/079911 dated Dec. 8, 2016.
Fitzpatrick "Chapter 6—Detecting Failure, Assessing Success" Medical Image Registration. CRC Press LLC. 2000.
Datteri "Assessing Registration Quality Via Registration Circuits" Disertation, Graduate School of Vanderbilt University. 2014.
Datteri, et al. "Validation of a Nonrigid Registration Error Detection Algorithm Using Clinical MRI Brain Data" IEEE Transactions on Medical Imaging, vol. 34, No. 1. Jan. 2015.
European Patent Office; Intention to Grant issued in App. No. 15813790; 11 pages; dated Sep. 4, 2019.

* cited by examiner

DETERMINATION OF REGISTRATION ACCURACY

The present invention relates to a medical data processing method, performed by a computer, for determining error analysis data describing the registration accuracy of an elastic registration between first and second image data describing images of an anatomical structure of a patient, and to a corresponding computer program and system.

Elastic registration is a method of mapping points from a source data set into a target data set which is believed to contain the same information in a different state. In the medical field, elastic registration is commonly applied. For example, in surgery there is often an uncertainty on the extent of organ movement after opening the skull or body. Intra-operative imaging is sometimes used to learn how much movement was caused by the opening. However, the imaging often has a limited quality compared with pre-operational imaging. Elastic registration is commonly used to map between the two.

Another field of application for elastic registration is radiotherapy. In radiotherapy, a standard way of positioning a patient is to use cone beam computed tomography. Organs like the liver and prostate often miss the contrast needed to clearly identify a tumor position in such scans. An elastic registration can be used to calculate a possible tumor location.

In an ideal elastic registration there would be no errors in the transformation vector for every data point (pixel/voxel). In reality, the transformation vector fields of the elastic registration contain an error (positional error). This error is usually unknown and therefore the user might not know the accuracy of the elastic registration.

One reason for errors in an elastic registration is the limited resolution of the imaging device. Another reason is noise introduced by the imaging method. Furthermore, it might be difficult, if not impossible, to map reality by elastic fusion. Moreover, the anatomy of the anatomical structure, for example a lung or a brain, may have changed between acquiring the first and second image.

To estimate this error, up to now the gold standard has been to calculate the target registration error (TRE). To do that, one needs to define and map landmarks with an elastic registration. Then an error per landmark can be measured by using the distance between the landmark and the mapped landmark. Usually the landmark and the mapped landmark are identified manually. The creation of landmarks limits the practical capability of this approach to academic cases. Another unwanted feature of the TRE is the inclusion of landmark intra-observer errors in the TRE both in source and target for all landmarks.

An aspect of the invention is to provide an improved method for determining the registration accuracy of an elastic registration which in particular allows to provide the user with an expected error of the elastic registration.

This problem is solved by the subject-matter of any appended independent claim.

Advantages, advantageous features, advantageous embodiments and advantageous aspects of the present invention are disclosed in the following and contained in the subject-matter of the dependent claims. Different advantageous features can be combined in accordance with the invention wherever technically expedient and feasible. Specifically, a feature of one embodiment which has the same or a similar function to another feature of another embodiment can be exchanged with said other feature, and a feature of one embodiment which adds an additional function to another embodiment can in particular be added to said other embodiment.

According to the present invention, a medical data processing method, performed by a computer, for determining error analysis data describing the registration accuracy of a first elastic registration between first and second image data describing images of an anatomical structure of a patient, comprises the step of acquiring the first image data describing a first image of the anatomical structure.

The method further comprises the step of acquiring the second image data describing a second image of the anatomical structure. Acquiring the first image data and acquiring the second image data may be performed by the same method (CT, MR etc.). For example the first image and the second image may be taken by the same method at different times. In another embodiment the first image data and the second image data may be acquired by different imaging methods. The first image data and the second image data may have an arbitrary number of dimensions.

The method further comprises the step of determining first registration data describing a first elastic registration of the first image data to the second image data by mapping the first image data to the second image data using a registration algorithm. In this step, the first image data is the source data which is mapped to the second image data being the target data.

Still further, the method comprises the step of determining second registration data describing a second elastic registration of the second image data to the first image data by mapping the second image data to the first image data using the registration algorithm. In this step, the second image data constitutes the source data to be mapped to the first image data being the target data.

The step of determining the first registration data and the step of determining the second registration data use the same registration algorithm. Nevertheless, the steps of determining the first registration data and determining the second registration data are independent from each other. In other words, the first registration data describing the first elastic registration is different from the second registration data describing the second elastic registration.

Moreover, the method comprises the step of determining error analysis data describing the registration accuracy of the first elastic registration based on the first registration data and the second registration data. In other words, determining the error analysis data involves the first elastic registration of the first image data (source data) to the second image data (target data) and the second elastic registration from the second image data (source data) to the first image data (target data). The error analysis data may be used to evaluate the registration accuracy. Accordingly, the error analysis data may be an indicator of the registration quality.

In one embodiment, the error analysis data may be associated with the registration accuracy by data processing. In this regard a correction function may be trained by means of examples. The correction function may be applied to the error analysis data to obtain the registration accuracy.

Furthermore, the obtained error analysis data may be used to evaluate various elastic registration algorithms. This way a ground truth data set may be built. For example a highly specialized registration algorithm with a high registration accuracy indicated by the determining error analysis data may be used to build a high-trust ground truth mapping. This mapping may then be used to rank multi-purpose registration algorithms. When using for example elastic registration to calculate a possible tumor location in radiotherapy, the error analysis data may be used to determine an expected positioning error uncertainty for the tumor.

All steps of the method according to the invention may be performed at/by at least one processor of at least one computer. Each step may be performed by at least one unit. Each unit may be a software unit or a hardware unit.

In one embodiment, determining the first registration data involves determining a first transformation vector field for transforming the first image data to the second image data and determining the second registration data involves determining a second transformation vector field for transforming the second image data to the first image data, wherein determining the first transformation vector field is independent from determining the second transformation vector field. In particular, the second transformation vector field is not determined as the inverse of the first transformation vector field. Accordingly, mapping of the first image data to the second image data is independent from mapping the second image data to the first image data.

In one embodiment, determining error analysis data comprises transforming the original position of a data point within the first image data using the first registration data, transforming the transformed position using the second registration data to obtain a new position of the data point, and calculating the distance between the original position and the new position of the data point to obtain an observed error. The observed error comprises the error made by the first elastic registration of the first image data to the second image data and the error of the second registration of the second image data to the first image data. The observed error may be determined by calculating or measuring the distance between the original position and the new position of the data point after the two transformations.

Determining error analysis data may comprise determining observed errors for a plurality of data points within the first image data. Accordingly, a plurality of observed errors may be determined. The plurality of observed errors may be subject to a post-processing of the error analysis data. In other words, the observed errors may be analyzed, in order to determine a real error for one registration only, for example the real error for the first elastic registration of the first image data to the second image data.

In one embodiment, determining the first registration data is independent from determining the second registration data. In one embodiment the registration algorithm may be an asymmetric algorithm, i.e. the registration algorithm may be not symmetric.

In one embodiment the method may comprise the step of determining an associating function. The associating function may describe a relation of the observed errors to registration quality indices. Examples for registration quality indices are target registration errors (TRE) or real mapping errors. The target registration errors (TRE) may be determined by means of mapped landmarks.

An associating function allows to estimate real mapping errors on the basis of observed errors. The associating function may be determined by fitting the observed errors to corresponding real mapping errors e.g. from ground truth data, in particular by least squares fitting. Using an associating function one can also predict a measurable target registration error from an observed error. As part of the post-processing of the observed errors, one can derive a function for the standard deviation of observed errors by fitting.

As part of the post-processing the observed errors may be subject to various kinds of statistical analysis. For example, a maximum observed error, a median observed error or the standard deviation of the observed errors may be determined. In one embodiment error histograms of the observed errors may be determined as part of the post-processing.

In one embodiment a registration accuracy indicator (RAI) may be determined by a plurality of observed errors and the associating function.

In one embodiment, the method comprises the step of determining for each of a plurality of sample data points within the first image data a set comprising an observed error and a real mapping error or a target registration error (TRE) and determining the associating function from associating the sets of observed errors and real mapping errors or target registration errors (TRE). This way, if the observed errors and the real mapping errors or the target registration errors (TRE) are known for a plurality of specific sample data points, the associating function may be determined by associating the sets of observed errors and real mapping errors or target registration errors (TRE), for example by fitting. Accordingly, the associating function may be a fitting function, for example a polynomial fitting function.

In one embodiment, determining a real mapping error may comprise defining a sample data point within the first image data, transforming the original position of the sample data point within the first image data using the first registration data, identifying the transformed position of the sample data point, calculating the distance between the transformed position of the sample data point and a real position of a sample data point within the second image data corresponding to the sample data point within the first image data to obtain the real mapping error.

One or more sample data points may constitute a landmark. The landmark may be defined by a user by selecting one or more sample data points within the first image data. The user may for example select a specific feature of the first image as a landmark which comprises one or more sample data points. By mapping the landmark using the first registration data, identifying the transformed position of the landmark and calculating the distance between the transformed position and the real position of the landmark target registration error may be determined for each landmark and therefore for each sample data point. A plurality of real mapping errors determined this way may be used for determining the associating function described above.

In another embodiment, determining a real mapping error comprises calculating virtual image data by transforming the first image data using the first registration data, determining auxiliary registration data describing an elastic registration of the first image data to the virtual image data by mapping the first image data to the virtual image data using the registration algorithm, defining a sample data point within the first image data, transforming the original position of the sample data point within the first image data using the first registration data to obtain a first transformed position of the sample data point, transforming the original position of the sample data point within the first image data using the auxiliary registration data to obtain a second transformed position of the sample data point, and calculating the distance between the first transformed position and the second transformed position to obtain a real mapping error.

The auxiliary registration data describes an ideal registration (without errors) of the first image data to the virtual image data. Therefore, calculating virtual image data and determining auxiliary registration data provides a basis for an ideal elastic registration (without errors). Instead of using virtual image data, ground-truth data from a ground-truth data set, in particular built based on a highly specialized registration algorithm with a good registration accuracy, may be used.

In one embodiment, the step of determining error analysis data comprises determining at least one statistical parameter for the plurality of observed errors. The statistical parameter may be for example a mean observed error or a standard deviation of the observed error.

In one embodiment, the step of determining error analysis data comprises defining at least one data area within the first image data and determining at least one local statistical parameter for the observed errors obtained for the data points within the at least one data area. Of course, a plurality of data areas within the first image data may be defined and the at least one local statistical parameter may be determined for each data area. For example, defining a data area may be accomplished by a user selecting a window within the first image.

The defined data area may include a critical area in which a large mapping error is expected, e.g. an area in which an anatomical structure, for example a lung or a brain, moved between recording the first and second image. The data area may be selected to contain a statistically meaningful number of observed errors. The calculated local statistical parameters for observed errors may be stored in the central location of each data area. Based on the local statistical parameters a meaningful localized error may be determined for elastic registration.

In one embodiment, the method may comprise the step of acquiring critical structure data describing the position of at least one critical structure in the first image data and calculating the distance between the position of the critical structure and the position of at least one data area within the first image data. Acquiring the critical structure data may comprise acquiring atlas data describing a model of the anatomical structure. The critical structure may be a region of interest (for a surgeon) within the anatomical structure. The critical structure may be for example a tumor. By calculating the distance between the position of the critical structure and the position of the at least one data area within the first image data, one may relate the local statistical parameter for the observed errors within the at least one data area to the critical structure. In other words, the user may evaluate if the observed errors within a defined data area are relevant to a region comprising the critical structure.

The present invention further relates to a program which, when running on a processor of a computer or when loaded into the memory of a computer, causes the computer to perform the method as described above and/or a program storage medium on which the program is stored, in particular in a non-transitory form.

Furthermore, the present invention relates to a computer, comprising a processor and a memory, wherein the program described above is running on the processor or loaded into the memory, or wherein the computer comprises the storage medium described above.

The method in accordance with the invention is for example a computer implemented method. For example, all the steps or merely some of the steps (i.e. less than the total number of steps) of the method in accordance with the invention can be executed by a computer. An embodiment of the computer implemented method is a use of the computer for performing a data processing method. The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is an augmented reality device (also referred to as augmented reality glasses) which can be used as "goggles" for navigating. A specific example of such augmented reality glasses is Google Glass (a trademark of Google, Inc.). An augmented reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. The monitor may also be the monitor of a portable, for example handheld, device such as a smart phone or personal digital assistant or digital media player.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing the data by means of a computer and for example within the framework of the method in accordance with the invention. The meaning of "acquiring data" also for example encompasses the scenario in which the data are received or retrieved by the computer implemented method or program, for example from another program, a previous method step or a data storage medium, for example for further processing by the computer implemented method or program. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data can be made "ready for use" by performing an additional step before the acquiring step. In accordance with this additional step, the data are generated in order to be acquired. The data are for example detected or captured (for example by an analytical device).

Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

The invention also relates to a program which, when running on a computer, causes the computer to perform one or more or all of the method steps described herein and/or to a program storage medium on which the program is stored (in particular in a non-transitory form) and/or to a computer comprising said program storage medium and/or to a (physical, for example electrical, for example technically generated) signal wave, for example a digital signal wave, carrying information which represents the program, for example the aforementioned program, which for example comprises code means which are adapted to perform any or all of the method steps described herein.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument).

For the purpose of this document, a computer is a technical computer which for example comprises technical, for example tangible components, for example mechanical and/or electronic components. Any device mentioned as such in this document is a technical and for example tangible device.

The n-dimensional image of a body is registered when the spatial location of each point of an actual object within a space, for example a body part in an operating theatre, is assigned an image data point of an image (CT, MR, etc.) stored in a navigation system.

Image registration is the process of transforming different sets of data into one co-ordinate system. The data can be multiple photographs and/or data from different sensors, different times or different viewpoints. It is used in computer vision, medical imaging and in compiling and analysing images and data from satellites. Registration is necessary in order to be able to compare or integrate the data obtained from these different measurements.

A landmark is a defined element of an anatomical body part which is always identical or recurs with a high degree of similarity in the same anatomical body part of multiple patients. Typical landmarks are for example the epicondyles of a femoral bone or the tips of the transverse processes and/or dorsal process of a vertebra. The points (main points or auxiliary points) can represent such landmarks. A landmark which lies on (for example on the surface of) a characteristic anatomical structure of the body part can also represent said structure. The landmark can represent the anatomical structure as a whole or only a point or part of it. A landmark can also for example lie on the anatomical structure, which is for example a prominent structure. An example of such an anatomical structure is the posterior aspect of the iliac crest. Another example of a landmark is one defined by the rim of the acetabulum, for instance by the centre of said rim. In another example, a landmark represents the bottom or deepest point of an acetabulum, which is derived from a multitude of detection points. Thus, one landmark can for example represent a multitude of detection points. As mentioned above, a landmark can represent an anatomical characteristic which is defined on the basis of a characteristic structure of the body part. Additionally, a landmark can also represent an anatomical characteristic defined by a relative movement of two body parts, such as the rotational centre of the femur when moved relative to the acetabulum.

Preferably, atlas data is acquired which describes (for example defines, more particularly represents and/or is) a general three-dimensional shape of the anatomical body part. The atlas data therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas data therefore represents the result of a statistical analysis of such medical image data for a plurality of human bodies. This result can be output as an image—the atlas data therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data.

The human bodies, the anatomy of which serves as an input for generating the atlas data, advantageously share a common feature such as at least one of gender, age, ethnicity, body measurements (e.g. size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects.

In the field of medicine, imaging methods (also called imaging modalities and/or medical imaging modalities) are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (so-called medical imaging modalities and/or radiological imaging methods) such as for instance computed tomography (CT) and cone beam computed tomography (CBCT, such as volumetric CBCT), x-ray tomography, magnetic resonance tomography (MRT or MRI), conventional x-ray, sonography and/or ultrasound examinations, and positron emission tomography. The image data thus generated is also termed "medical imaging data". Analytical devices for example are used to generate the image data in apparatus-based imaging methods. The imaging methods are for example used for medical diagnostics, to analyse the anatomical body in order to generate images which are described by the image data. The imaging methods are also for example used to detect pathological changes in the human body. However, some of the changes in the anatomical structure, such as the pathological changes in the structures (tissue), may not be detectable and for example may not be visible in the images generated by the imaging methods. A tumour represents an example of a change in an anatomical structure. If the tumour grows, it may then be said to represent an expanded anatomical structure. This expanded anatomical structure may not be detectable; for example, only a part of the expanded anatomical structure may be detectable. Primary/high-grade brain tumours are for example usually visible on MRI scans when contrast agents are used to infiltrate the tumour. MRI scans represent an example of an imaging method. In the case of MRI scans of such brain tumours, the signal enhancement in the MRI images (due to the contrast agents infiltrating the tumour) is considered to represent the solid tumour mass. Thus, the tumour is detectable and for example discernible in the image generated by the imaging method. In addition to these tumours, referred to as "enhancing" tumours, it is thought that approximately 10% of brain tumours are not discernible on a scan and are for example not visible to a user looking at the images generated by the imaging method.

Image fusion can be elastic image fusion or rigid image fusion. In the case of rigid image fusion, the relative position between the pixels of a 2D image and/or voxels of a 3D image is fixed, while in the case of elastic image fusion, the relative positions are allowed to change.

In this application the terms "elastic registration", "elastic fusion" and "deformable registration" are used synonymously. Furthermore, in this application, the term "image morphing" is also used as an alternative to the term "elastic image fusion", but with the same meaning.

Elastic fusion transformations (for example, elastic image fusion transformations) are for example designed to enable a seamless transition from one dataset (for example a first dataset such as for example a first image) to another dataset (for example a second dataset such as for example a second image). The transformation is for example designed such that one of the first and second datasets (images) is deformed, for example in such a way that corresponding structures (for example, corresponding image elements) are arranged at the same position as in the other of the first and second images. The deformed (transformed) image which is transformed from one of the first and second images is for example as similar as possible to the other of the first and second images. Preferably, (numerical) optimisation algorithms are applied in order to find the transformation which results in a maximum degree of similarity. The degree of similarity is preferably measured by way of a measure of similarity (also referred to in the following as a "similarity measure"). The parameters of the optimisation algorithm usually determine the amount of change between two steps on the to be optimized parameters. A result of each of these steps are for example vectors of a deformation field. By applying the deformation field to the image data, the similarity between two images is determined. The vectors are determined by the optimisation algorithm in such a way as to result in an maximum degree of similarity. Thus, the maximum degree of similarity represents a condition, for example a constraint, for the optimisation algorithm. The bases of the vectors lie for example at voxel positions of one of the first and second images which is to be transformed, and the tips of the vectors lie at the corresponding voxel positions in the transformed image. A plurality of these vectors are preferably provided, for instance for every data point from the imaging. Preferably, there are (other) constraints on the transformation (deformation), for example in order to avoid pathological deformations (for instance, all the voxels being shifted to the same position by the transformation). These constraints include for example the constraint that the transformation is regular, which for example means that a Jacobian determinant calculated from a matrix of the deformation field (for example, the vector field) is larger than zero, and also the constraint that the transformed (deformed) image is not self-intersecting. The constraints include for example the constraint that if a regular grid is transformed simultaneously with the image and in a corresponding manner, the grid is not allowed to interfold at any of its locations. The optimising problem is for example solved iteratively, for example by means of an optimisation algorithm which is for example a first-order optimisation algorithm, such as a gradient descent algorithm. Other examples of optimisation algorithms include optimisation algorithms which do not use derivations, such as the downhill simplex algorithm, or algorithms which use higher-order derivatives such as Newton-like algorithms. The optimisation algorithm preferably performs a local optimisation. If there are a plurality of local optima, global algorithms such as simulated annealing or generic algorithms can be used. In the case of linear optimisation problems, the simplex method can for instance be used.

In the steps of the optimisation algorithms, the voxels are for example shifted by a magnitude in a direction such that the degree of similarity is increased. This magnitude is preferably less than a predefined limit, for instance less than one tenth or one hundredth or one thousandth of the diameter of the image, and for example about equal to or less than the distance between neighbouring voxels. Large deformations can be implemented, for example due to a high number of (iteration) steps.

In particular, the invention does not involve or in particular comprise or encompass an invasive step which would represent a substantial physical interference with the body requiring professional medical expertise to be carried out and entailing a substantial health risk even when carried out with the required professional care and expertise. For example, the invention does not comprise a step of positioning a medical implant in order to fasten it to an anatomical structure or a step of fastening the medical implant to the anatomical structure or a step of preparing the anatomical structure for having the medical implant fastened to it. More particularly, the invention does not involve or in particular comprise or encompass any surgical or therapeutic activity.

Figure 2:
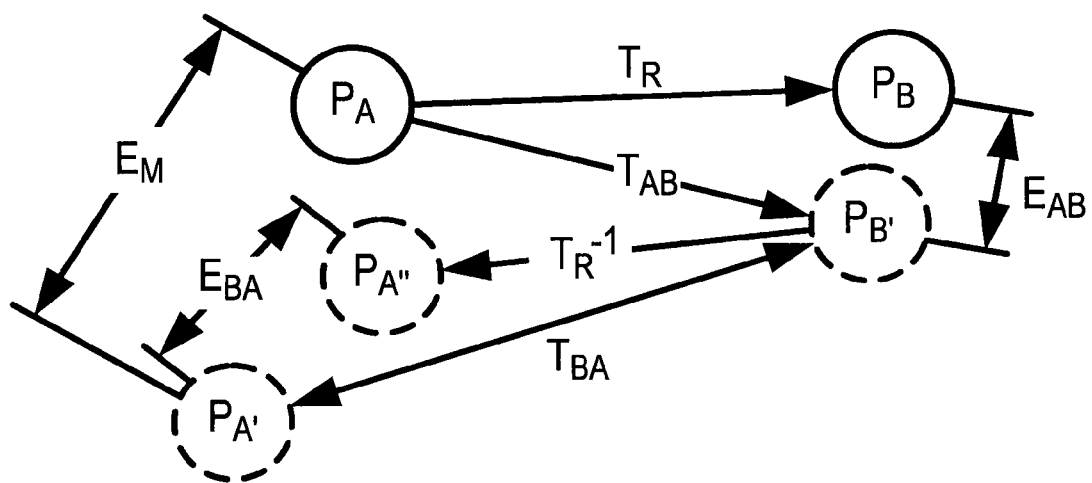
Figure 3:
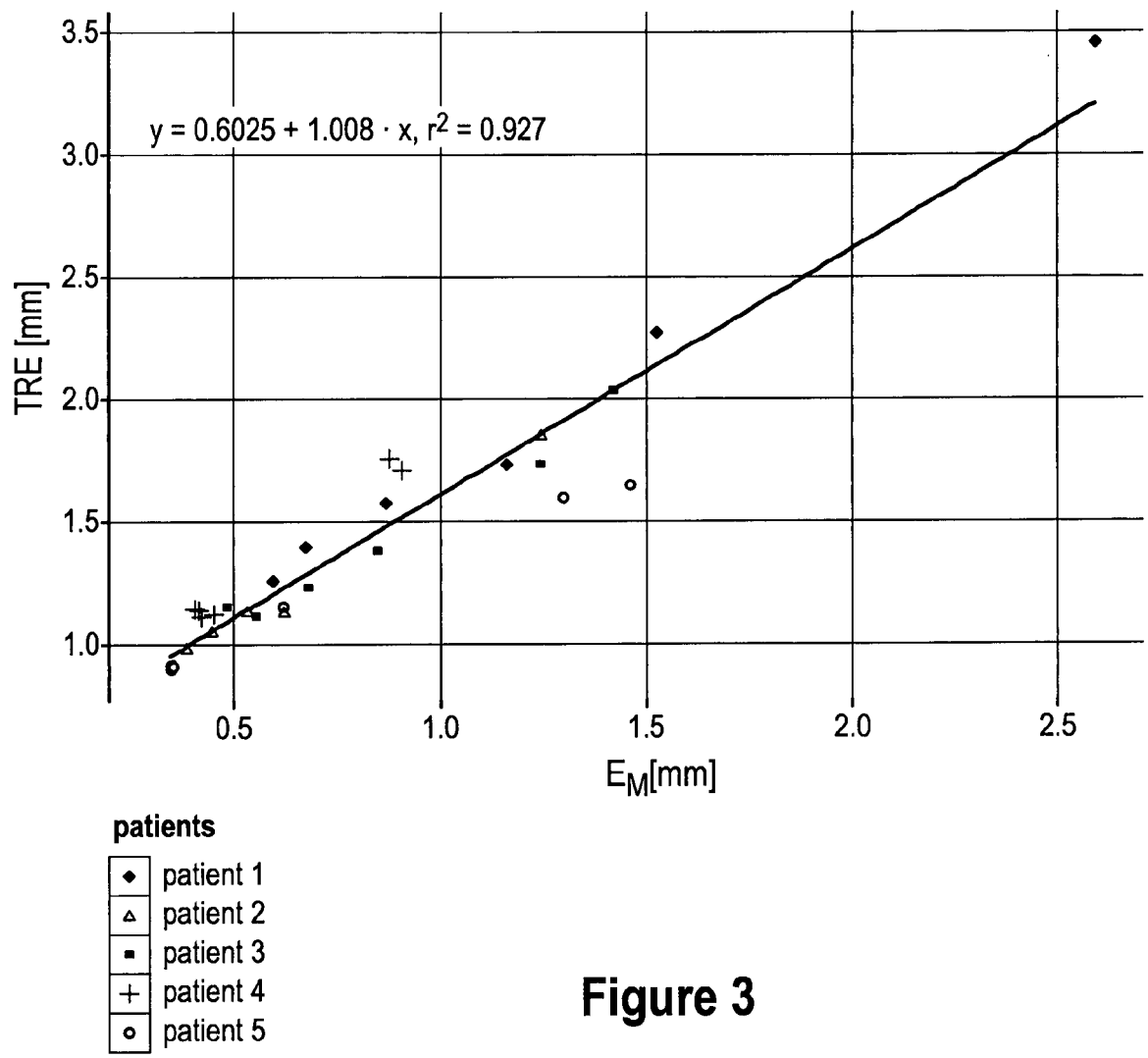
Figure 4:
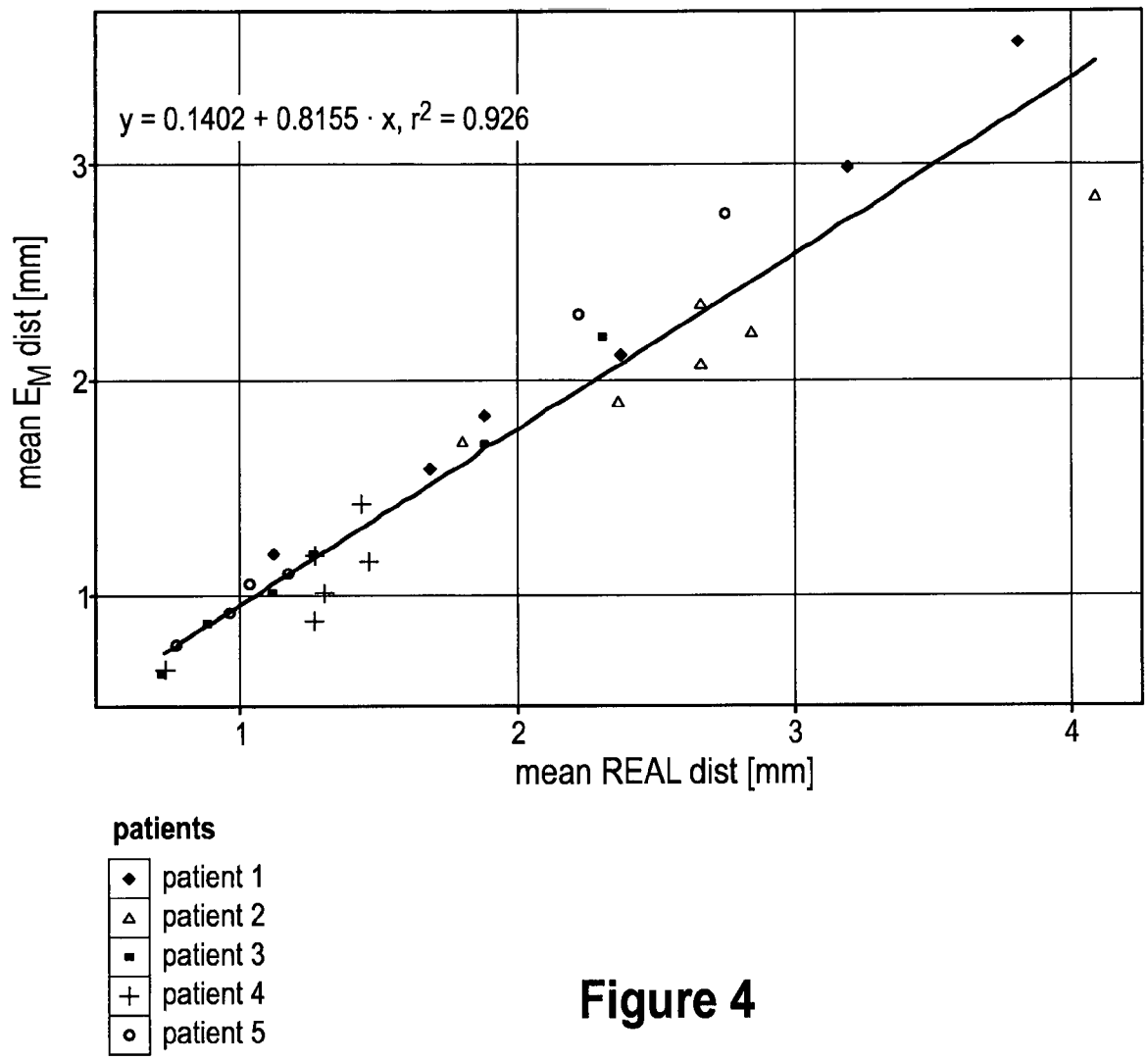
Figure 5:
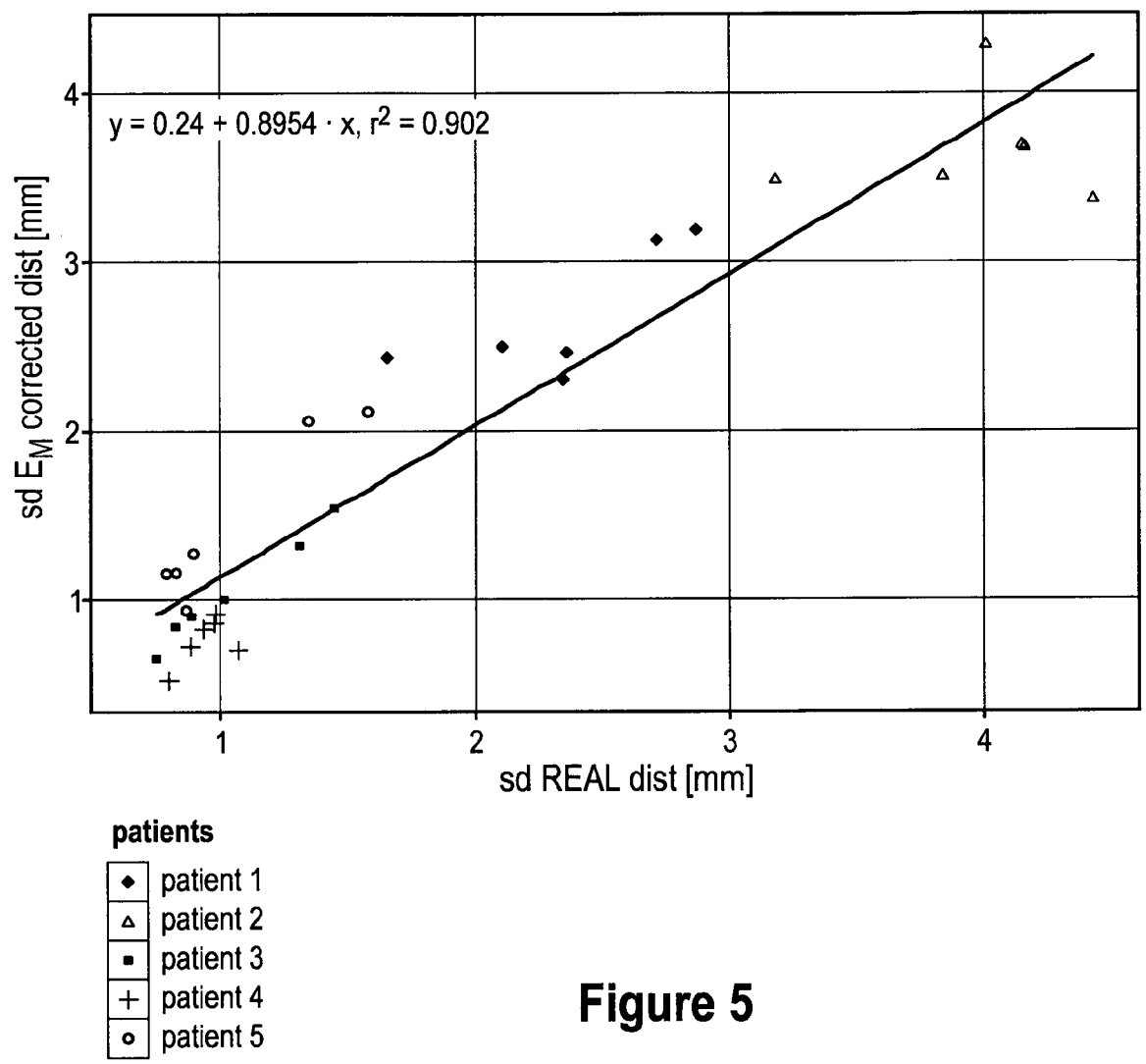
Figure 6:
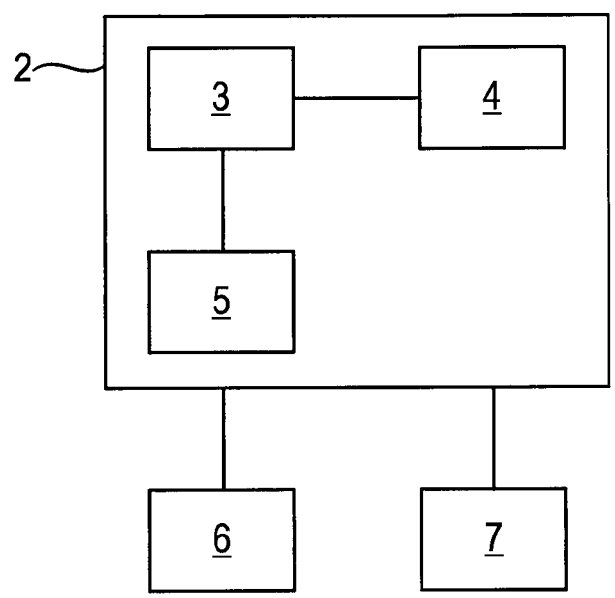

In the following, the invention is described with reference to the enclosed figures which represent preferred embodiments of the invention. The scope of the invention is not however limited to the specific features disclosed in the figures, which show:

FIG. 1 a flow chart of a method for determining error analysis data,

FIG. 2 a schematic diagram of the formation of errors during elastic registration and the application of the method, FIG. 3 a diagram of target registration error (TRE) versus observed error ($E_M$), FIG. 4 a diagram of mean observed error ($E_M$) versus mean real error, FIG. 5 a diagram of standard deviation of observed error ($E_M$) versus standard deviation of real error, and FIG. 6 a computer performing the method.

FIG. 1 shows a flowchart of a method for determining error analysis data describing the registration accuracy of a first elastic registration between first and second image data describing images of an anatomical structure of a patient. The terms "elastic registration", "elastic fusion" and "deformable registration" are used synonymously.

Step S01 involves acquiring first image data (Volume A) describing a first image of the anatomical structure. Step S02 involves acquiring second image data (Volume B) describing a second image of the anatomical structure. The image data may be provided by means of any one of the above-mentioned imaging methods.

Step S03 involves determining first registration data describing a first elastic registration of the first image data to the second image data by mapping the first image data to the second image data using a registration algorithm. Step S04 involves determining second registration data describing a second elastic registration of the second image data to the first image data by mapping the second image data to the first image data using the registration algorithm.

Step S05 involves determining error analysis data describing the registration accuracy of the first elastic registration based on the first registration data and the second registration data. In an optional step S06 the determined error analysis data may be further processed by a post-processing method.

FIG. 2 is a schematic diagram showing the formation of errors during the disclosed method. A data point $P_A$ in the first image data A is transformed by a first transformation vector $T_{AB}$ to a data point $P_{B'}$ in the second image data B. The first transformation vector $T_{AB}$ is included in the first registration data. Transforming a data point in the first image data A to a data point in the second image data B means transforming the original position of the data point in the first image data to the transformed position in the second image data B.

Furthermore, FIG. 2 shows that transforming the data point $P_A$ in the first image data A to the data point $P_{B'}$ in the second image data B is not correct. The corresponding data point for $P_A$ in image data B is $P_B$. A hypothetical vector $T_R$ describes the real transformation from $P_A$ to $P_B$. The data point $P_{B'}$ and $P_B$ are separated by a distance which represents a real mapping error $E_{AB}$ of the transformation by the first transformation vector $T_{AB}$. One aspect of the disclosed method is to estimate the real mapping error $E_{AB}$.

As shown by FIG. 2, the data point $P_{B'}$ in the second image data is transformed by a second transformation vector $T_{BA}$ into the data point $P_N$ in the first image data. The second transformation vector $T_{BA}$ is included in the second registration data. Furthermore, the data point $P_{B'}$ is transformed by the inverse of the real transformation vector $T_R^{-1}$ into data point $P_{A''}$ in the first image data. The distance between the data point $P_{A'}$ and the data point $P_{A''}$ represents an error $E_{BA}$ in the second transformation vector $T_{BA}$.

The real mapping error $E_{AB}$ of the first transformation vector $T_{AB}$ and the error $E_{BA}$ of the second transformation vector $T_{BA}$ cannot be measured directly.

The distance between the data point $P_A$ and the data point $P_{A'}$ represents an observed error $E_M$ which can be measured. The observed error $E_M$ is expressed by the following formula:

$$E_M = |T_{BA}(T_{AB}(P_A)) - P_A| = E_{AB} + E_{BA}$$

Registration accuracy indicators (RAI) may be determined by a plurality of observed errors $E_m$ according to the following formulae, where f is an associating function:

$$RAI_{mean} = f\left(\frac{1}{n}\sum_{i=1}^{n} E_M^i\right)$$

$$RAI_\sigma = f\left(\sqrt{\frac{1}{n}\sum_i (x_i - RAI_{mean})^2}\right) \text{ let}$$

$$E_M^i \in \{E_M^1, \ldots, E_M^n\} = M \text{ with } E_M^i \leq E_M^{i+1} \text{ and } n = |M|, \text{ then}$$

$$RAI_{median} = f\left(E_M^{\frac{|M|}{2}}\right)$$

$$RAI_{min} = f(E_M^1)$$

$$RAI_{max} = f(E_M^n)$$

In one embodiment the observed errors $E_M$ may be related to real mapping errors $E_{AB}$ or target registration errors (TRE). Nevertheless, the following assumptions are made:
the registration algorithm is not symmetric
the registration is not biased, i.e. there is no systematic errors (under- or overestimation) of the registration
normally distributed scattering of the observed errors $E_M$ around the real error $E_{AB} + E_{BA}$
the transformation vector fields do not have a large gradient
the real mapping errors $E_{AB}$ do not have a large gradient FIG. 3 depicts a diagram of target registration error (TRE) versus observed error $E_M$ for five data sets, i.e. patient1 to patient5. FIG. 3 shows that for a particular registration algorithm fulfilling above assumptions, $E_M$ and TRE are essentially the same (on average) except for a scaling factor. Therefore, the observed error $E_M$ actually provides a valuable indication for the registration accuracy of the elastic registration.

The least squares fitting function shown in FIG. 3 is an example for an associating function which describes a relation of observed errors $E_M$ to target registration errors (TRE). Using such an associating function, one can predict a measurable target registration error (TRE) from the observed errors $E_M$. Analogously, one can derive such an associating function for the standard deviation of errors. All such fitting may be part of the optional post-processing step.

Making above assumptions the observed errors $E_M$ may be related to real mapping errors $E_{AB}$. As long as the error from mapping data point $P_A$ to data point $P_E$ is small, mapping data point $P_{B'}$ to data point $P_{A'}$ is similar to mapping data point $P_{B'}$ to data point $P_{A''}$. When this is true, the distribution of the observed errors $E_M$ resembles a mixed Gaussian distribution. With this knowledge a real error distribution may be deducted analytically. Under the assumptions above the standard deviation of the real errors $E_{AB}$ is smaller than the standard deviation of observed errors $E_M$.

As mentioned above, TRE has a limited usability. A way of determining the real mapping error $E_{AB}$ comprises calculating virtual image data by transforming the first image data A using the first registration data, determining auxiliary registration data describing an elastic registration of the first image data A to the virtual image data by mapping the first data to the virtual image data, defining a sample data point within the first image data, transforming the original position of the sample data point within the first image data using the first registration data to obtain a first transformed position of the sample data point, transforming the original position of the sample data point within the first image data using the auxiliary registration data to obtain a second transformed position of the sample data point and calculating the distance between the first transformed position and the second transformed position to obtain the real mapping error $E_{AB}$. In other words, virtual image data is calculated by using a real transformation vector field.

A sample data point is transformed using a transformation vector field comprising the (ideal) first registration data and is also transformed by the auxiliary registration data. Calculating the distance between the two transformed data points provides the real mapping error $E_{AB}$ for the auxiliary registration data. Similarly a real mapping error $E_{BA}$ may be calculated by using the inverse of the first registration data and a second auxiliary registration data.

For the tests shown in FIGS. 4 and 5 noise was added to the virtual image data to generate worse registrations. In FIG. 4 mean $E_M$ is plotted against mean real errors $E_{AB}$ determined as mentioned above. In FIG. 5 the standard deviation of $E_M$ is plotted against the standard deviation of the real errors $E_{AB}$. When comparing the values for mean $E_M$ and mean real errors $E_{AB}$, one may notice that $E_M$ is not a perfect match for the real error $E_{AB}$. In FIGS. 4 and 5 two associating functions which describe a relation of $E_M$ to real mapping errors $E_{AB}$ are depicted. The associating functions were derived by using least squares fitting with a linear function. Other fitting functions are applicable.

The observed errors $E_M$ may be used in the raw form to rank registrations or to threshold the results within a certain limit. Furthermore, the observed errors $E_M$ may be used to generate a reference model like the (measurable) TRE. Furthermore, as discussed above, the observed and cumulated errors $E_M$ may be related to real mapping errors $E_{AB}$.

By defining a data area within the image data and determining a statistical parameter for the observed errors obtained for the data points within the data area a localized error may be determined. In particular, the defined data area may be a sliding region which is moved over the image data. By calculating local statistical parameters for observed errors within a plurality of defined data areas a meaningful localized error may be generated.

Furthermore, the data area may be defined with respect to a specific anatomical structure, for example the lung or the liver of a patient. The observed error for the data points within such a defined data area is then specific to the anatomical structure. Determining localized errors may provide valuable information to the user of the elastic registration. For example, areas with a bad mapping could be highlighted, minimizing the risk of wrong interpretation.

Furthermore, localized errors may be determined for a region within the image data comprising a critical structure, such as a tumor. Providing the user with information about localized errors in relation to a critical structure allows a more meaningful evaluation of the registration accuracy. This way confidence intervals for the registrations errors may be provided to the user.

FIG. 6 shows a computer 2 including a processor 3, a memory 4 and an interface 5. The computer 2 is connected to an input unit 6, such as a mouse, a keyboard or a touch-sensitive surface, and an output unit 7 such as a display, a speaker or a tactile sensation generation unit. A program causing the computer 2 to perform the method according to the invention may be loaded into the memory 4 of the computer. In one embodiment the program may be stored on a program storage medium comprised in or connected to the computer 2.

The invention claimed is:

1. A system, comprising at least one computer having at least one processor configured to execute a method for determining error analysis data describing registration accuracy of a first elastic registration between first and second image data describing images of an anatomical structure of a patient, the method comprising executing, by the at least one processor of the at least one computer, the steps of:
   acquiring, at the at least one processor, the first image data describing a first image of the anatomical structure;
   acquiring, at the at least one processor, the second image data describing a second image of the anatomical structure;
   determining, by the at least one processor, first registration data describing the first elastic registration of the first image data to the second image data by mapping the first image data to the second image data using a registration algorithm;
   determining, by the at least one processor, second registration data describing a second elastic registration of the second image data to the first image data by mapping the second image data to the first image data using the registration algorithm;
   determining, by the at least one processor, error analysis data describing the registration accuracy of the first elastic registration based on the first registration data and the second registration data;
   wherein determining, by the at least one processor, the error analysis data comprises:
   transforming an original position of a data point within the first image data using the first registration data;
   transforming the transformed position using the second registration data to obtain a new position of the data point;
   calculating a distance between the original position and the new position of the data point to obtain an observed error specific to the anatomical structure;
   wherein determining error analysis data comprises determining observed errors for a plurality of data points within the first image data;
   wherein determining error analysis data comprises determining at least one statistical parameter from the plurality of observed errors;
   wherein determining error analysis data comprises defining at least one data area with respect to the anatomical structure within the first image data and determining at least one local statistical parameter for the observed errors obtained for data points within the at least one data area, wherein the at least one local statistical parameter is a maximum observed error, a median observed error, a mean observed error or a standard deviation of the observed error;
   wherein the method further includes the step of acquiring, at the at least one processor, critical structure data describing a position of at least one critical structure corresponding to a region of interest within the anatomical structure in the first image data and calculating the distance between the position of the at least one critical structure and a position of at least one data area within the first image data, the critical structure data representing an area within the first image data which is distinct from the at least one data area;
   wherein by calculating the distance between the position of the at least one critical structure and the position of the at least one data area within the first image data, the at least one local statistical parameter for the observed errors within the at least one data area is related to the at least one critical structure.

2. A method for determining error analysis data describing registration accuracy of a first elastic registration between first and second image data describing images of an anatomical structure of a patient, the method comprising executing, by at least one processor of at least one computer, the steps of:
   acquiring, at the at least one processor, the first image data describing a first image of the anatomical structure;
   acquiring, at the at least one processor, the second image data describing a second image of the anatomical structure;
   determining, by the at least one processor, first registration data describing the first elastic registration of the first image data to the second image data by mapping the first image data to the second image data using a registration algorithm;
   determining, by the at least one processor, second registration data describing a second elastic registration of the second image data to the first image data by mapping the second image data to the first image data using the registration algorithm;
   determining, by the at least one processor, error analysis data describing the registration accuracy of the first elastic registration based on the first registration data and the second registration data;
   wherein determining, by the at least one processor, the error analysis data comprises:
   transforming an original position of a data point within the first image data using the first registration data;
   transforming the transformed position using the second registration data to obtain a new position of the data point;
   calculating a distance between the original position and the new position of the data point to obtain an observed error specific to the anatomical structure;
   wherein determining error analysis data comprises determining observed errors for a plurality of data points within the first image data;
   wherein determining error analysis data comprises determining at least one statistical parameter from the plurality of observed errors;
   wherein determining error analysis data comprises defining at least one data area with respect to the anatomical structure within the first image data and determining at least one local statistical parameter for the observed errors obtained for data points within the at least one data area, wherein the at least one local statistical parameter is a maximum observed error, a median observed error, a mean observed error or a standard deviation of the observed error;
wherein the method further includes the step of acquiring, at the at least one processor, critical structure data describing a position of at least one critical structure corresponding to a region of interest within the anatomical structure in the first image data and calculating the distance between the position of the at least one critical structure and a position of at least one data area within the first image data, the critical structure data representing an area within the first image data which is distinct from the at least one data area;
wherein by calculating the distance between the position of the at least one critical structure and the position of the at least one data area within the first image data, the at least one local statistical parameter for the observed errors within the at least one data area is related to the at least one critical structure.

3. The method according to claim 2, wherein determining, by the at least one processor, the first registration data involves determining a first transformation vector field for transforming the first image data to the second image data and determining, by the at least one processor, the second registration data involves determining a second transformation vector field for transforming the second image data to the first image data, wherein determining the first transformation vector field is independent from determining the second transformation vector field.

4. The method according to claim 2, further comprising the step of determining, by the at least one processor, an associating function which describes a relation of the observed errors to real mapping errors or target registration errors.

5. The method according to claim 4, further comprising the step of determining, by the at least one processor, for each of a plurality of sample data points within the first image data a set comprising an observed error and a real mapping error or a target registration error and determining the associating function from associating the sets of observed errors and real mapping errors or target registration errors.

6. The method according to claim 4, wherein determining, by the at least one processor, a real mapping error comprises:
defining a sample data point within the first image data;
transforming the original position of the sample data point within the first image data using the first registration data;
identifying the transformed position of the sample data point;
calculating the distance between the transformed position of the sample data point and a real position of the sample point within the second image data corresponding to the sample data point within the first image data to obtain the real mapping error.

7. The method according to claim 4, wherein determining, by the at least one processor, a real mapping error comprises:
calculating virtual image data by transforming the first image data using the first registration data;
determining auxiliary registration data describing an ideal elastic registration without errors of the first image data to the virtual image data by mapping the first image data to the virtual image data using the registration algorithm;
defining a sample data point within the first image data;
transforming the original position of the sample data point within the first image data using the first registration data to obtain a first transformed position of the sample data point;
transforming the original position of the sample data point within the first image data using the auxiliary registration data to obtain a second transformed position of the sample data point;
calculating the distance between the first transformed position and the second transformed position to obtain the real mapping error.

8. The method according to claim 2, wherein acquiring, at the at least one processor, the critical structure data comprises acquiring atlas data describing a model of the anatomical structure.

9. A non-transitory computer-readable program storage medium storing a computer program which, when executed by at least one processor of at least one computer, causes the at least one computer to perform a medical data processing method for determining error analysis data describing registration accuracy of a first elastic registration between first and second image data describing images of an anatomical structure of a patient, the method comprising the steps of:
acquiring, at the at least one processor, the first image data describing a first image of the anatomical structure;
acquiring, at the at least one processor, the second image data describing a second image of the anatomical structure;
determining, by the at least one processor, first registration data describing the first elastic registration of the first image data to the second image data by mapping the first image data to the second image data using a registration algorithm;
determining, by the at least one processor, second registration data describing a second elastic registration of the second image data to the first image data by mapping the second image data to the first image data using the registration algorithm;
determining, by the at least one processor, error analysis data describing the registration accuracy of the first elastic registration based on the first registration data and the second registration data;
wherein determining, by the at least one processor, the error analysis data comprises:
transforming an original position of a data point within the first image data using the first registration data;
transforming the transformed position using the second registration data to obtain a new position of the data point;
calculating a distance between the original position and the new position of the data point to obtain an observed error specific to the anatomical structure;
wherein determining error analysis data comprises determining observed errors for a plurality of data points within the first image data;
wherein determining error analysis data comprises determining at least one statistical parameter from the plurality of observed errors;
wherein determining error analysis data comprises defining at least one data area with respect to the anatomical structure within the first image data and determining at least one local statistical parameter for the observed errors obtained for data points within the at least one data area, wherein the at least one local statistical parameter is a maximum observed error, a median observed error, a mean observed error or a standard deviation of the observed error;

wherein the method further includes the step of acquiring, at the at least one processor, critical structure data describing a position of at least one critical structure corresponding to a region of interest within the anatomical structure in the first image data and calculating the distance between the position of the at least one critical structure and a position of at least one data area within the first image data, the critical structure data representing an area within the first image data which is distinct from the at least one data area;

wherein by calculating the distance between the position of the at least one critical structure and the position of the at least one data area within the first image data, the at least one local statistical parameter for the observed errors within the at least one data area is related to the at least one critical structure.

10. A computer, comprising a non-transitory computer-readable program storage medium storing a computer program which, when executed by at least one processor of the computer, causes the computer to perform a medical data processing method for determining error analysis data describing registration accuracy of a first elastic registration between first and second image data describing images of an anatomical structure of a patient, the method comprising the steps of:

acquiring, at the at least one processor, the first image data describing a first image of the anatomical structure;

acquiring, at the at least one processor, the second image data describing a second image of the anatomical structure;

determining, by the at least one processor, first registration data describing the first elastic registration of the first image data to the second image data by mapping the first image data to the second image data using a registration algorithm;

determining, by the at least one processor, second registration data describing a second elastic registration of the second image data to the first image data by mapping the second image data to the first image data using the registration algorithm;

determining, by the at least one processor, error analysis data describing the registration accuracy of the first elastic registration based on the first registration data and the second registration data;

wherein determining error analysis data comprises determining observed errors for a plurality of data points within the first image data;

wherein determining error analysis data comprises determining at least one statistical parameter from the plurality of observed errors specific to the anatomical structure;

wherein determining error analysis data comprises defining at least one data area with respect to the anatomical structure within the first image data and determining at least one local statistical parameter for the observed errors obtained for data points within the at least one data area, wherein the at least one local statistical parameter is a maximum observed error, a median observed error, a mean observed error or a standard deviation of the observed error;

wherein determining, by the at least one processor, error analysis data comprises:

transforming an original position of a data point within the first image data using the first registration data;

transforming an transformed position using the second registration data to obtain a new position of the data point;

calculating a distance between the original position and the new position of the data point to obtain an observed error;

wherein the method further includes the step of acquiring, at the at least one processor, critical structure data describing a position of at least one critical structure corresponding to a region of interest within the anatomical structure in the first image data and calculating the distance between the position of the at least one critical structure and a position of the at least one data area within the first image data, the critical structure data representing an area within the first image data which is distinct from the at least one data area;

wherein by calculating the distance between the position of the at least one critical structure and the position of the at least one data area within the first image data, the at least one local statistical parameter for the observed errors within the at least one data area is related to the at least one critical structure.

11. A method for determining error analysis data describing a registration accuracy of a first elastic registration between first and second image data describing images of an anatomical structure of a patient, the method comprising executing, by at least one processor of at least one computer, the steps of:

acquiring, at the at least one processor, the first image data describing a first image of the anatomical structure;

acquiring, at the at least one processor, the second image data describing a second image of the anatomical structure;

determining, by the at least one processor, first registration data describing the first elastic registration of the first image data to the second image data by mapping the first image data to the second image data using a registration algorithm;

determining, by the at least one processor, second registration data describing a second elastic registration of the second image data to the first image data by mapping the second image data to the first image data using the registration algorithm;

determining, by the at least one processor, error analysis data describing the registration accuracy of the first elastic registration based on the first registration data and the second registration data;

wherein determining error analysis data comprises
determining observed errors for a plurality of data points within the first image data;
the determining a plurality of observed errors for the plurality of data points within the first image includes:
transforming the original positions of a data points within the first image data using the first registration data;
transforming the transformed positions using the second registration data to obtain a new positions of the data points;
calculating distances between the original positions and the new positions of the data points to obtain an observed error;
determining at least one statistical parameter from the plurality of observed errors;
defining at least one data area with respect to the anatomical structure within the first image data and determining at least one local statistical parameter for the observed errors obtained for the data points within the at least one data area;

acquiring critical structure data describing a position of at least one critical structure corresponding to a region of interest within the anatomical structure in the first image data and calculating a distance between the position of the at least one critical structure and a position of at least one data area within the first image data;

the at least one local statistical parameter for the plurality of observed errors within the at least one data area is related to the at least one critical structure.

* * * * *